May 29, 1934.  R. C. REDPATH ET AL  1,960,978
HARVESTER FOR LOW GROWING SEED CROPS, SUCH AS LESPEDEZA, CLOVER, AND COW PEAS
Filed July 24, 1933  3 Sheets-Sheet 1
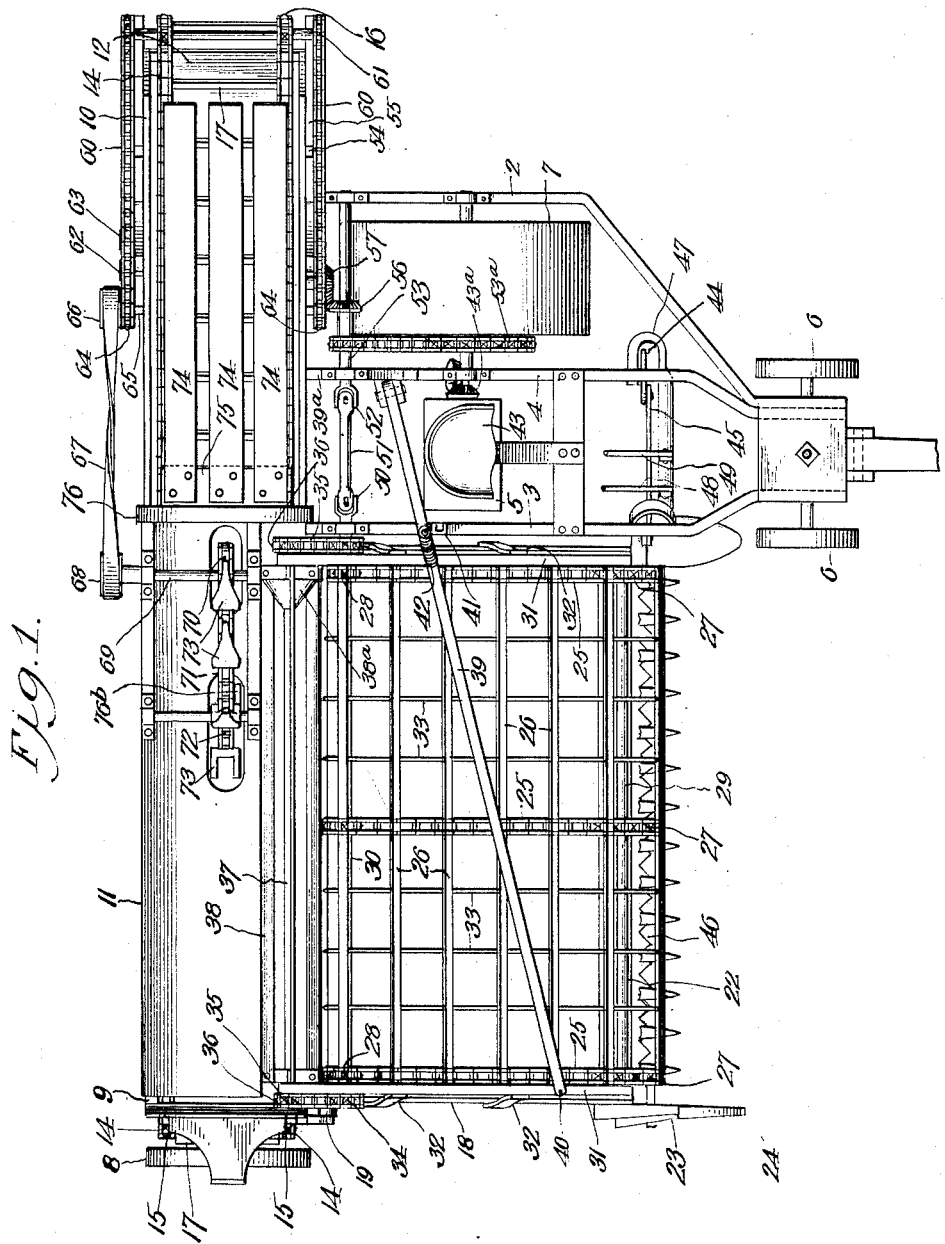
Inventors
Robert C. Redpath and
James S. Redpath
By Thorp & Thorpe
Attorneys

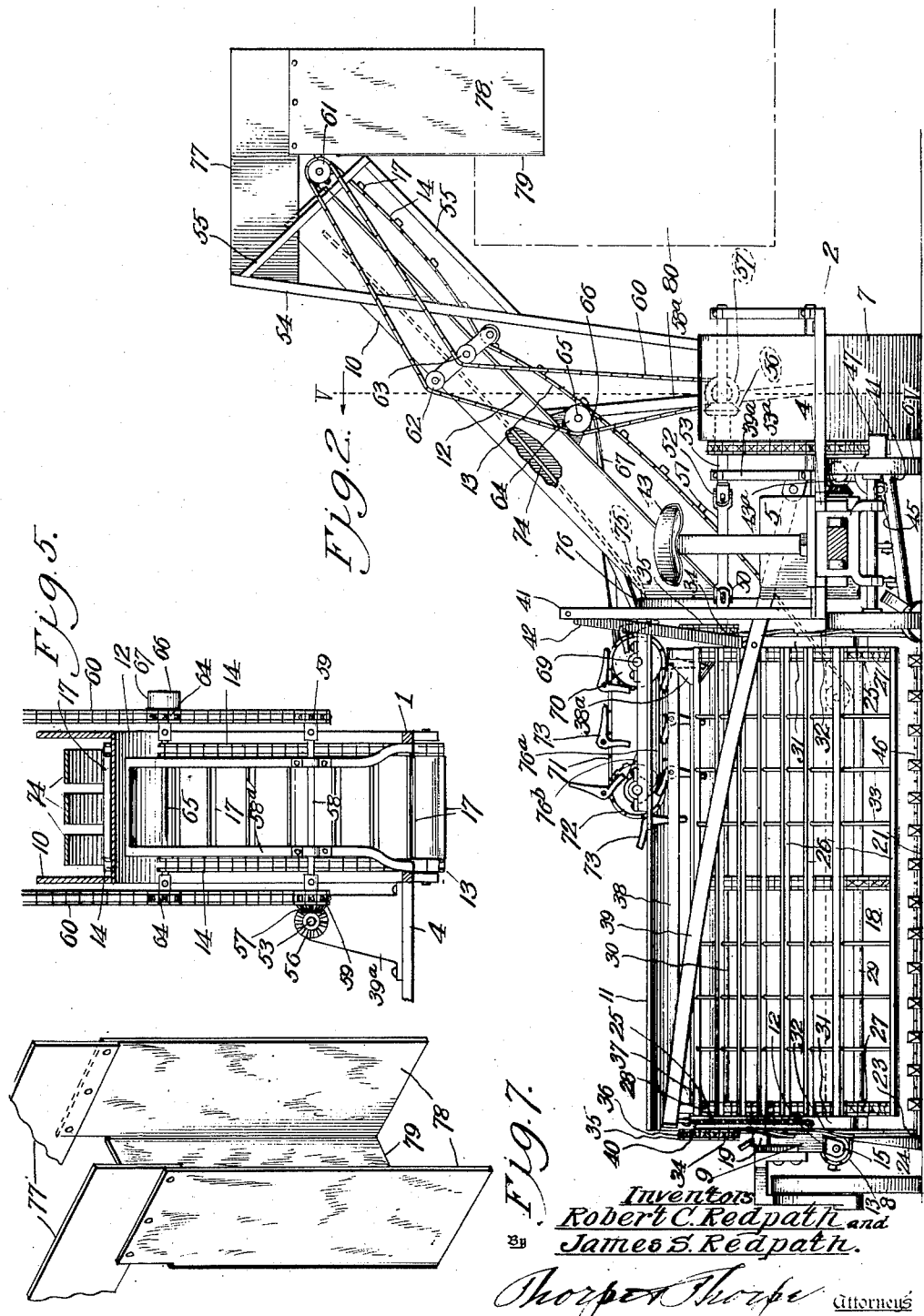

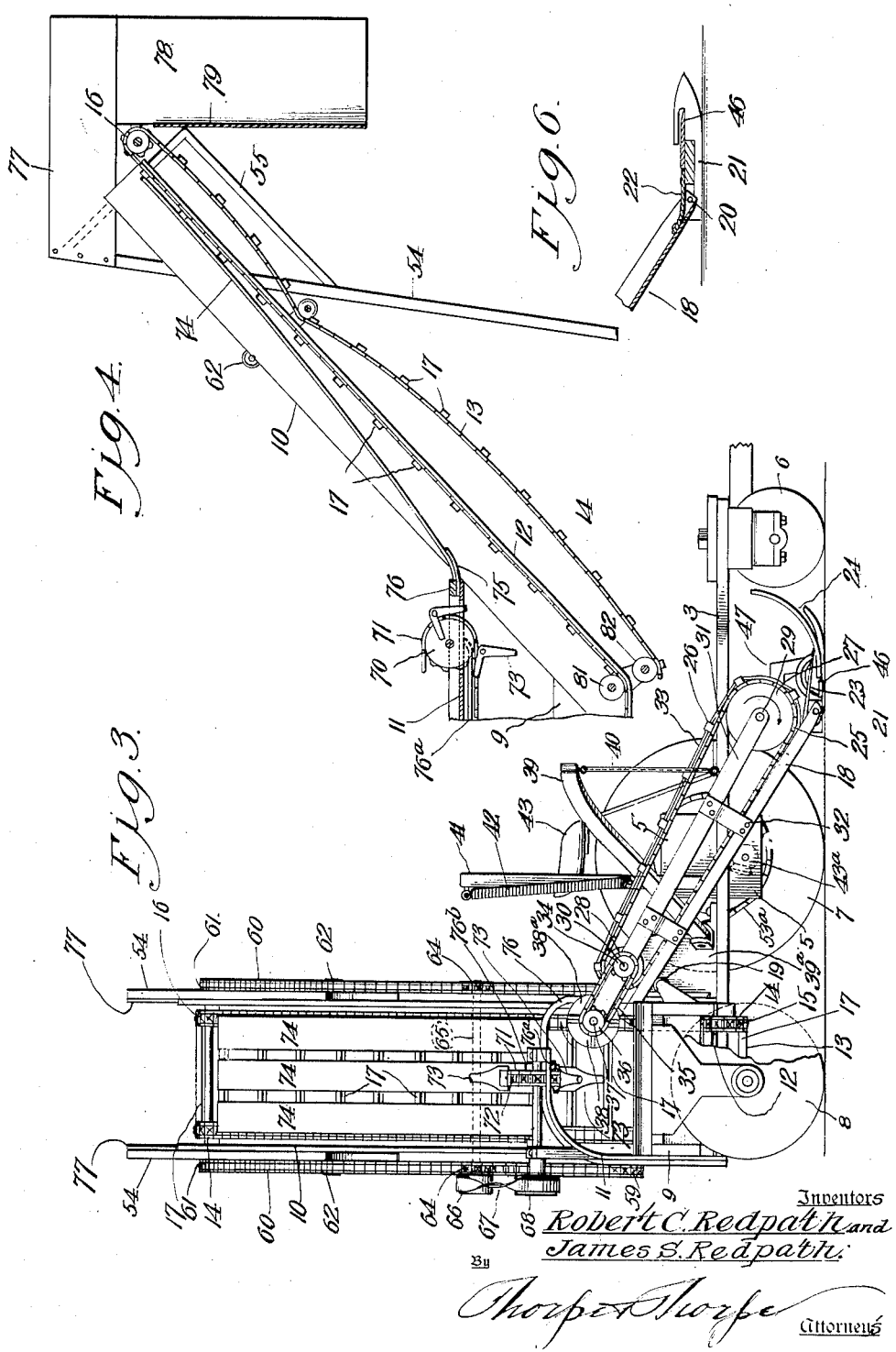

Patented May 29, 1934

1,960,978

UNITED STATES PATENT OFFICE 1,960,978

HARVESTER FOR LOW GROWING SEED CROPS, SUCH AS LESPEDEZA, CLOVER, AND COW PEAS

Robert C. Redpath and James S. Redpath, Johnson County, Kans.

Application July 24, 1933, Serial No. 681,910

11 Claims. (Cl. 56—23)

This invention relates to harvesting machines, and more particularly to a machine for cutting lespedeza, clover and other low growing seed plants, and for elevating the cuttings and seed falling therefrom as the plants are cut, and discharging the crop into a wagon traversing the field with the machine, and my object is to produce a machine of the character mentioned which functions efficiently without appreciable loss of cutting or seed, and which is relatively inexpensive in construction.

With the objects mentioned in view, the invention consists in certain novel and useful features of construction and combinations of parts as hereinafter described and claimed; and in order that it may be fully understood, reference is to be had to the accompanying drawings, in which:—

Figure 1 is a plan view of a machine embodying the invention.

Figure 2 is a front view of the machine.

Figure 3 is a side view of the machine.

Figure 4 is a fragmentary front view, with the forward side wall of the receptacle and elevator omitted and showing a wind shield in vertical section.

Figure 5 is a section on the line V—V of Figure 2.

Figure 6 is a fragmentary vertical section to show the connection between the rear edge of the cutting mechanism and the front end of the pan for receiving the cut plants and loose seed which falls from the plants as they are cut.

Figure 7 is a detail perspective view of the wind shield.

In the said drawings, a rigid horizontal frame of steel or equivalent beams, is shown as composed of an oblong rectangular portion 1 and a portion projecting forwardly from one end of portion 1, and shown as having an outside beam 2, and an inside beam 3, and an intermediate beam 4, the two latter beams affording a mount for a gas engine or the like, shown conventionally as at 5; and the front end of the forwardly-projecting portion is mounted on a pair of guide and supporting wheels 6. There is a large bullwheel 7 between the beams 2 and 4 substantially to the rear relative to wheels 6, and a wheel 8 supports the opposite end of the portion 1, from the bull wheel.

The portion 1 forms the base support of a receptacle 9, and extending up from the end thereof adjacent the bull wheel, at approximately the angle shown, is an elevator 10 of the same width as the receptacle and open at both ends. The receptacle is open at the discharge end from which the elevator projects and is closed at the other end, the receptacle and elevator being open at the top, though the former is partly overhung by a shield 11 to guard against loss of cuttings and loose seed as and after they are discharged into the box, as hereinafter explained.

The receptacle is designed to receive the cut grain and the loose seed to pass it to the elevator, and from the latter it is discharged into a wagon or other container or the like, which will travel side by side with the machine and below the discharge or upper end of the elevator.

The receptacle and elevator structures have in common, a smooth bottom 12, and an endless conveyor 13 operates to carry the material to the top of the elevator for discharge into the wagon. The conveyor consists of a pair of parallel sprocket chains 14 overlying and underlying the bottom 12, and engaging end sprocket wheels 15 and 16 at the remote extremities of the receptacle and elevator, the chains being connected by cross slats 17, the upper strand of the conveyor engaging the upper side of the bottom 12 to sweep loose seeds as well as the cuttings, to the discharge point of the elevator.

A smooth pan 18 having upstanding side flanges, rests at its rear end slidably and pivotally on a roller 19 at the top of the front wall of the receptacle, and slopes downwardly and forwardly therefrom and is pivotally secured at 20 to and supported at its front edge by the base bar 21 of a conventional mower mechanism resting upon the ground, the support providing for up and down and sliding movement of the pan, to permit it to be disposed in inoperative position and accommodate irregularities in the surface of the ground, and the joint between the front end of the pan and the said bar 21, is bridged by a canvas strip 22 to avoid loss of seed at the joint.

To insure the cutting of all plants or parts of plants in the path of the sickle bar of the mower element, the base bar or right hand runner 23 thereof is equipped with a press-down finger 24 which curves upwardly and forwardly from the runner. This finger not only presses down the plants in its path, but also presses down parts entangled therewith of plants to the right of the path of the sickle bar so that the latter shall be enabled to cut, not only the plants in its path, but the parts entangled therewith and within the line of cut, of plants to the right of the line of cut.

It is important that the cutting mechanism shall not pass inoperatively under plant branches overlapping the path of the cutter bar, as such branches, more or less entangled with plants within the said path, would interfere with the free upward conveyance of the cut plants on the pan by the overlying conveyor (herebelow described), and to insure that the cutting mechanism shall not miss such branches, resort is had to the use of the press-down finger, which, standing higher than such branches, presses them down so that they shall be cut and be free for conveyance upward upon the pan. Without the press-down finger uncut plants entangled with cut plants, offer considerable resistance to the operation of the machine and tend to pull cut plants off the right-hand side of the pan and clog the overlying conveyor and necessitate occasional stops to untangle the clogging mass by hand. The use of the press-down finger insures a clean cut cleavage and avoids the necessity of stoppages for the purpose mentioned.

To effect the travel of the cut plants and seed upwardly on the pan, an endless conveyor overlies the pan and extends from a point above the front end of the pan to a point above the forward side wall of the receptacle. The conveyor consists of a plurality of chains 25 connected by spaced slats 26 and mounted on sprocket wheels 27 and 28 of shafts 29 and 30 journaled in supporting side bars 31 above and rigidly secured to the side walls of the pan by upright bars 32, the arrangement being such that the slats of the lower strand of the conveyor sweep upwardly on the pan for delivery of the cut plants and seeds dropping therefrom upon the pan, into the receptacle. To make the action of the conveyor most effective, it is necessary to prevent entanglement of the cut plants with the upper or downwardly operating strand of the conveyor, and to accomplish this the slats are connected by cords 33 or the like, at close enough intervals to co-operate with the slats in holding the underlying cut plants pressed down upon the pan. The rear shaft 30, of the pair forming part of the said conveyor is the driving shaft, and at the outer sides of the sprocket wheels 28, thereon, carries smaller sprocket wheels 34 connected by chains 35 to sprocket wheels 36 on a shaft 37 journaled in the upper rear ends of bars 31 over the receptacle. The shaft 37 is equipped with a rotary beater 38, which engages the mass of cut material as it reaches the top of the pan, and forces it downward within the receptacle and upon the endless slatted conveyor running through the receptacle and elevator, as explained. The beater, which is shown as of reel type, extends for the full width of the pan and the conveyor overlying the pan, and the end of the beater adjacent the bull wheel, is in the form of a conical deflector 38a for deflecting cuttings toward the right, as it has been found that the cuttings tend to bunch or clog at such point unless a deflecting action is provided.

To sustain the dead weight of the pan and overlying conveyor, a beam or lever 39 is disposed at a substantial height over the conveyor. It is fulcrumed on and preferably extends diagonally forward from a bracket on a bearing standard 39a on the frame at a point near the forward right hand corner of the pan. It is pivotally connected at its forward end by a (preferably) flexible link 40 to the right hand bar 31. At an intermediate point it is adjacent a rigid standard 41 on the frame, and a retractile spring 42 connects the beam or lever to said standard, the spring having sufficient lifting force to take the weight of the pan and its conveyor off the mower mechanism. The beam or lever is disposed as shown to impose the weight of the pan largely on the frame contiguous to the bull wheel.

As indicated, the engine shown conventionally below the seat 43, is utilized through suitable connections 43a, to operate an eccentric 44 and a pitman 45 pivotally connects the eccentric to the sickle bar 46. The conventional drag bar 47 is connected by links 48 and 49 to hand and foot levers (not shown), the operation of the former being to elevate the cutting and associated mechanism for travel to and from a field or to clear high obstructions. The foot lever may be utilized to rock the cutting mechanism to clear low obstructions, and when the machine is being turned, it being understood in this connection that the plants to be cut are always to the right of the draft animals or tractor (not shown), to be hitched forward of guide wheels 6. If used with a tractor its power take off (not shown), may be utilized to drive the cutting mechanism and conveyors. The shaft 30 of the conveyor for supplying the receptacle, is connected by a universal joint 50 with a short shaft 51, and the latter is connected by a second universal joint 52 with a shaft 53 to be driven from the bull wheel, as shown at 53a, or directly from the power take off of the tractor.

Each wagon driven along with the machine to receive the discharge from the elevator, is usually equipped with a high box body for capacity reasons, and the elevator to overtop them must be approximately eight feet high at the discharge end. Braces 54 are therefore employed to support the elevator from the wheeled frame, and it has also been found that to fend off conflict between the machine and wagons and thereby guard against injury to the elevator, truss braces 55 are desirable, the braces extending from the braces 54 to the upper end of the elevator.

To operate the elevator conveyor, the shaft 53 is equipped with a gear 56 meshed with a gear 57 on a shaft 58 journaled on a frame 58a, secured to the bottom of the elevator and to the framework (see Figure 5), and said shaft is provided with a pair of sprocket wheels 59 connected by chains 60 with sprocket wheels 61 on the shaft of sprocket wheels 16.

The chains 60 run over suitably supported guide rolls 62 and 63 on the elevator frame and engage and drive sprocket wheels 64 on a shaft 65 journaled on frame 58a and equipped with a pulley 66 connected by a cross belt 67 with a pulley 68 on a suitable journaled shaft 69 at the top of the shield 11. The last named shaft carries a sprocket wheel 70 depending through the shield over the receptacle and is connected by a chain 71 with a similar sprocket wheel 72, also depending through the shield, and a series of pushers 73 are pivoted to the chain. The pushers will engage the mass of cuttings should they tend to bunch or accumulate at the point where the conveyor bends to carry the cuttings and seed upward through the elevator, and to insure proper travel up through the elevator and guard against loss therefrom in windy weather, a series of slats 74 are disposed longitudinally within the elevator to impose light pressure down upon the cuttings, the lower ends of the hold down slats being fastened to a plate 75 secured to an arch 76 rigid with the wheeled frame, the connection being in about the horizontal plane of the shield and adjacent the discharge end of the pusher equipped conveyor. The latter is preferably of that conventional type in which the pushers are of right angle form and so pivoted to the chain that near the lower strand of the latter, a bar 76a secured to shield 11, prevents the depending arms of the pushers swinging back beyond a substantially vertical position in their travel toward the elevator. As the pushers clear the bar 76a, they swing back flatly against the chain, so that the arms pull out of the mass of cuttings as said arms pass up around wheel 70 and through the shield. As the pushers reach the wheel 72, there other arms engage a cam 76b, and are pivotally turned until the pushers assume an operative position as they pass downward through the shield, and as they attain such operative position and move rearward, they encounter the upturned front end of bar 76a and are brought to and held thereby at full operative position for the purpose of applying force on any mass or accumulation of plants which may lie in the path.

It is essential that the cuttings and loose seed shall be protected in windy weather as discharged from the upper end of the elevator. To afford such protection, a pair of stiff plates 77 are secured to the upper ends of braces 54, and project beyond the discharge end of conveyor 13, and suspended from the plates is a flexible shield, consisting of sides 78 secured at the upper ends to the plates, and a transverse portion 79, foreshortened at its upper end adjacent the elevator so that the discharge from the latter shall pass over such end and fall within the shield into a wagon box, indicated by dotted lines 80. The shield should, for best efficiency, be long enough to depend into the wagon box, and therefore must be flexible, or at least the lower portion should be flexible so that it will brush aside without injury as a wagon is driven to or from operative position.

As the machine, drawn by tractor or animal power, traverses a field of lespedeza or the like, the engine operates the sickle bar and the front end of the conveyor over the pan acts as a reel to press the plants rearward and downward so that the cutting action shall be effective and dependable, and so that the cuttings shall be pressed down upon the pan with the loose seed falling thereon from the cuttings, the fall of seed being most noticeable when the crop is fully ripened, it being noted also that there is a complete cleavage of all plants or parts within the path of the sickle from those standing to the right.

The cuttings pressed down on the pan as explained, are forced upwardly upon the pan by the overlying conveyor, the slats and cords holding the mass against dislodgment by wind and at the same time forcing it upward on the pan and eventually into the receptacle. The beater drives the mass downward upon the conveyor in the receptacle so that the conveyor therein shall force it to and up through the elevator and discharge it at the top thereof, it being heretofore explained that no chokage can occur at the lower end of the elevator because a mass tending to accumulate at that point is acted upon by the pushers and forced toward and under the holddown slats, it being understood that the rear opening in the shield, strips the pushers of any cuttings tending to cling thereto. The holddown slats apply light pressure on the mass of cuttings ascending the elevator so that loose material can neither slide or roll back or be blown from the elevator, and as the stream of material clears the upper end of the clamp strips and is free to fall, it is protected by the enclosing shield, the protection continuing until it enters the wagon box, another wagon replacing a loaded one without necessitating the stopping of the harvesting operation for more than a minute or so. To hold the upper strand conveyor 13 depressed at the point of junction of the receptacle and elevator 10, a roller 81 is shown, a similar roller 82 forming a guide for the lower strand of the conveyor below the receptacle and elevator.

It is to be understood that we reserve the right to all changes within the spirit of the invention and without the ambit of the prior art.

We claim:

1. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, and a conveyor over the pan to press plant cuttings cut by the cutting mechanism, down on the pan and force them upward thereon and discharge such material into said receptacle.

2. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and pivotally joined to the front ends of the pan, a flexible strip secured to the pan and cutting mechanism and bridging the joint between them, and an endless conveyor overlying the pan for forcing and holding cut material to move to the upper end of the pan and discharge such material into the receptacle upon the conveyor therein.

3. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan to carry material cut from plants by the cutting mechanism upward on the pan and discharge such material into said receptacle, and a rotary beater paralleling the receptacle and disposed at the rear end of the last-named conveyor to force the cut material down into the receptacle.

4. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan to carry material cut from plants by the cutting mechanism upward on the pan and discharge such material into said box, and a rotary beater paralleling the receptacle and disposed at the rear end of the last-named conveyor to force the cuttings down into the receptacle, the beater being equipped rearward of the left-hand side of the pan conveyor with a conical deflector.

5. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a press-down finger projecting forward and upward from the right hand extremity of the cutting mechanism, and a conveyor over the pan to carry material cut from the plants by the cutting mechanism upward on the pan and discharge such material into the receptacle.

6. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to carry material cut from plants by the cutting mechanism upward on the pan and discharge such material into said receptacle, and means above the receptacle and adjacent the point of communication thereof with the elevator, for engaging the upper portion of material carried by the receptacle conveyor, to cooperate with the latter in starting such material up through the elevator.

7. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to press plant cuttings cut by the cutting mechanism, down on and into the pan and force them upward thereon and discharge such material into said receptacle, a shield rising from the rear side of and overhanging the receptacle, and operating means mounted on and depending through the shield for engaging material carried by the receptacle conveyor, to cooperate with the latter in starting the material up through the elevator.

8. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to press plant cuttings cut by the cutting mechanism, down on said pan and force them upward thereon and discharge such material into said receptacle, and means for overlying and holding the material within the elevator, upon the conveyor.

9. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to press plant cuttings cut by the cutting mechanism, down on said pan and force them upward thereon and discharge such material into said receptacle, and a wind-shield encompassing the discharge end of the elevator and depending to a point substantially lower than said discharge end.

10. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to press plant cuttings cut by the cutting mechanism, down on said pan and force them upward thereon and discharge such material into said receptacle, and yielding means for relieving the cutting mechanism of the weight of the pan and overlying conveyor.

11. A harvesting machine, comprising a wheeled frame having a transverse receptacle open at one end, an inclined elevator communicating at its lower end with the open end of the receptacle, an endless conveyor extending through the receptacle and elevator, a pan sloping downwardly and forwardly from the top of the front wall of the receptacle, a cutting mechanism at and connected to the front end of the pan, a conveyor over the pan to press plant cutting cut by the cuttings mechanism, down on said pan and force them upward thereon and discharge such material into said receptacle, a beam overlying the conveyor and pan and pivoted to the frame at a point to the left of the pan and linked to the latter, at the opposite end, and a retractile spring exerting force tending to lift the pan and thereby relieve the cutting mechanism of the weight of the pan and its conveyor.

ROBERT C. REDPATH.
JAMES S. REDPATH.